United States Patent [19]

Hara et al.

[11] Patent Number: 4,981,017
[45] Date of Patent: Jan. 1, 1991

[54] TURBOCHARGER CONTROL SYSTEM

[75] Inventors: Shinji Hara, Fujisawa; Yoshihisa Koizumi, Yohohama, both of Japan

[73] Assignee: Isuzu Motors Limited, Tokyo, Japan

[21] Appl. No.: 415,785

[22] Filed: Oct. 2, 1989

[30] Foreign Application Priority Data

Oct. 31, 1988 [JP] Japan ................. 63-275302

[51] Int. Cl.⁵ ............................................ F02B 37/14
[52] U.S. Cl. ............................................. 60/608
[58] Field of Search ............................. 60/607, 608

[56] References Cited
U.S. PATENT DOCUMENTS

| 4,756,377 | 7/1988 | Kawamura et al. | 60/608 X |
| 4,774,811 | 10/1988 | Kawamura | 60/608 |
| 4,901,530 | 2/1990 | Kawamura | 60/608 |

*Primary Examiner*—Michael Koczo
*Attorney, Agent, or Firm*—Staas & Halsey

[57] ABSTRACT

A turbocharger control system controls a turbocharger associated with an engine mounted on a motor vehicle, the turbocharger having a rotary electric machine mounted on the rotatable shaft thereof. When it is determined that the motor vehicle is about to start, the rotary electric machine is operated as an electric motor to effect a flying boost increase before the accelerator pedal is depressed. The boost pressure of the turbocharger is therefore increased to increase the response of acceleration of the motor vehicle to the depression of the accelerator pedal when the motor vehicle is started.

3 Claims, 2 Drawing Sheets

TURBOCHARGER CONTROL SYSTEM

BACKGROUND OF THE INVENTION

1. Field of the Invention

The present invention relates to a turbocharger control system for supplying pressurized air to an internal combustion engine, and more particularly, to a turbocharger control system having a rotary electric machine mounted on a rotatable shaft by which a turbine and a compressor are interconnected.

2. Description of the Related Art

The internal combustion engines on many motor vehicles are provided with turbochargers. Immediately after the accelerator pedal of such a motor vehicle is depressed to start the motor vehicle, since the rotational speed of the engine is low, the energy of exhaust gases discharged from the engine is low. Therefore, the rotational speed of the engine is also low, and so is the boost pressure produced by the turbocharger. As the accelerator pedal is continuously depressed, the engine rotational speed is progressively increased, and so is the exhaust energy. Consequently, the rotational speed of the turbocharger is increased and the boost pressure is also increased.

As described above, an internal combustion engine equipped with a turbocharger suffers a time lag or delay after the accelerator pedal is depressed until the boost pressure produced by the turbocharger is actually increased. Such a time lag is referred to as a "turbo lag", and is responsible for the poor acceleration of a motor vehicle with a turbocharged engine when the motor vehicle is started.

To reduce such a turbo lag, there has been proposed in Japanese Laid-Open Patent Publication No. 60(1985)-195329 a turbocharger control system in which a rotary electric machine is mounted on the rotatable shaft of a turbocharger combined with an engine on a motor vehicle. When the accelerator pedal of the motor vehicle is depressed, the rotary electric machine is operated as an electric motor to assist in rotating the turbocharger, thereby increasing the boost pressure thereof while the engine is rotating at a low speed.

The proposed turbocharger control system greatly reduces the turbo lag at a start of the motor vehicle. However, the response of acceleration of the motor vehicle to a depression of the accelerator pedal is slightly lower than that of a motor vehicle which is equipped with a supercharger. Such a response delay is caused for the following reason: The supercharger produces a boost pressure even while the engine is idling, but the turbocharger does not produce any substantial boost pressure while the engine is idling. Even if the rotary electric machine coupled to the turbocharger is operated as an electric motor when the accelerator pedal is depressed, it takes a little time before the rotational speed of the rotary electric machine reaches a predetermined speed to assist the turbocharger.

SUMMARY OF THE INVENTION

It is an object of the present invention to provide a turbocharger control system for controlling a turbocharger combined with an internal combustion engine mounted on a motor vehicle so as to reduce a turbocharger lag so that the motor vehicle can start with the same response as a motor vehicle powered by a supercharged internal combustion engine.

According to the present invention, there is provided a control system for controlling a turbocharger having a turbine operable by exhaust gases discharged from an engine mounted on a motor vehicle, a compressor coupled to the turbine by a rotatable shaft, and a rotary electric machine mounted on the rotatable shaft, the control system comprising an engine speed sensor for detecting the rotational speed of the engine, a clutch operation sensor for detecting a disengagement of the clutch, a gear position sensor for detecting a gear position of a transmission of the motor vehicle, a vehicle speed sensor for detecting the speed at which the motor vehicle is running, and control means operable in response to signals from the engine speed sensor, the clutch operation sensor, the gear position sensor, and the vehicle speed sensor, for operating the rotary electric machine as an electric motor when the rotational speed of the engine is lower than a predetermined speed, the clutch is disengaged, the gear position of the transmission is in a vehicle starting position, and the vehicle speed is lower than a predetermined speed.

According to the present invention, there is also provided a control system for controlling a turbocharger having a turbine operable by exhaust gases discharged from an engine mounted on a motor vehicle, a compressor coupled to the turbine by a rotatable shaft, and a rotary electric machine mounted on the rotatable shaft, the control system comprising intake restriction means for restricting the rate of air flow into the turbocharger, the intake restriction means being disposed in an intake pipe for introducing air into the compressor of the turbocharger, an engine speed sensor for detecting the rotational speed of the engine, a clutch operation sensor for detecting a disengagement of the clutch, a gear position sensor for detecting a gear position of a transmission of the motor vehicle, a vehicle speed sensor for detecting the speed at which the motor vehicle is running, and control means operable in response to signals from the engine speed sensor, the clutch operation sensor, the gear position sensor, and the vehicle speed sensor, for operating the rotary electric machine as an electric motor and controlling the variable intake restriction means when the rotational speed of the engine is lower than a predetermined speed, the clutch is disengaged, the gear position of the transmission is in a vehicle starting position, and the vehicle speed is lower than a predetermined speed.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
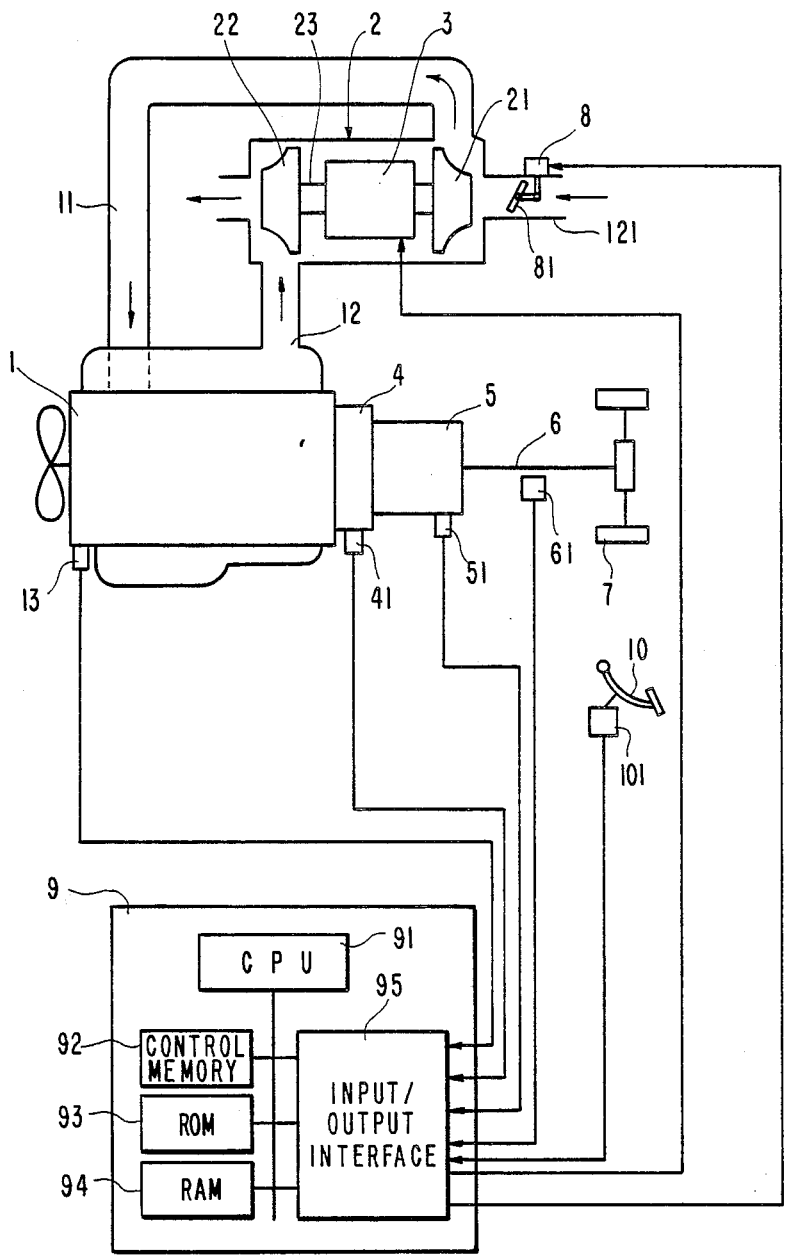
FIG. 1 is a block diagram of a turbocharger control system, combined with a turbocharged internal combustion engine, according to the present invention.

FIG. 1 shows a turbocharger control system for a motor vehicle according to the present invention. An internal combustion engine 1, such as a diesel engine or a gasoline engine, is mounted on the motor vehicle and produces rotative power which is transmitted through a clutch 4, a transmission 5, and a drive shaft 6 to road wheels 7 to move the motor vehicle. The motor vehicle has various sensors such as an engine rotational speed sensor 13 for detecting the rotational speed of the engine 1, a clutch operation sensor 41 for detecting whether the clutch 4 is engaged or disengaged, a gear position sensor 51 for detecting a selected gear position of the transmission 5, a vehicle speed sensor 61 for detecting the speed at which the motor vehicle travels, based on the rotational speed of a rotative power transmitting means such as the drive shaft 6, and an accelerator pedal position sensor 101 for detecting the depth to which an accelerator pedal 10 coupled to the engine 1 is depressed. Detected signals from these sensors are supplied to a control unit 9.

A turbocharger 2 mounted on the engine 1 comprises a compressor 21, a turbine 22, and a rotatable shaft 23 by which the compressor 21 and the turbine 22 are interconnected. The turbocharger 2 has its scrolls connected to an intake pipe 11 and an exhaust pipe 12 which are joined to the engine 1. The turbine 22 is rotated by exhaust gases discharged from the engine 1 and flowing through the exhaust pipe 12 into the turbocharger 2. The compressor 21 is rotated by the turbine 22 through the shaft 23, and compresses air drawn into the turbocharger 2. Compressed air is then supplied under increased pressure through the intake pipe 11 into the engine 1.

A rotary electric machine 3 mounted on the rotatable shaft 23 of the turbocharger 2 is operable as either an electric motor or an electric generator. When the rotary electric machine 3 is operated as a motor, it assists in rotating the turbocharger 2, and when the rotary electric machine 3 is operated as a generator, it converts the energy of exhaust gases from the engine 1 to electric energy which will be recovered.

A variable intake restriction valve 81 is disposed in an intake pipe 121 leading to the compressor 21 of the turbocharger 2. The restriction valve 81 is operable by an actuator 8 on the intake pipe 121. When the restriction valve 81 is closed by the actuator 8, it limits the rate of air flow into the compressor 21.

The control unit 9 comprises a central processing unit (CPU) 91 for effecting arithmetic operations based on a program, a read-only memory (ROM) 93 for storing the program and various preset values or parameters, a random access memory (RAM) 94 for temporarily storing the results of arithmetic operations effected by the CPU 91 and various data, a control memory 92 for controlling operation of various elements of the control unit 9, and an input/output interface 95 for receiving and supplying signals. The control unit 9 is supplied with detected signals from the engine speed sensor 13, the clutch operation sensor 41, the gear position sensor 51, the vehicle speed sensor 61, and the accelerator pedal movement sensor 101, effects programmed arithmetic operations on these detected signals, and applies control signals to the rotary electric machine 3 and the actuator 8.

Figure 2:
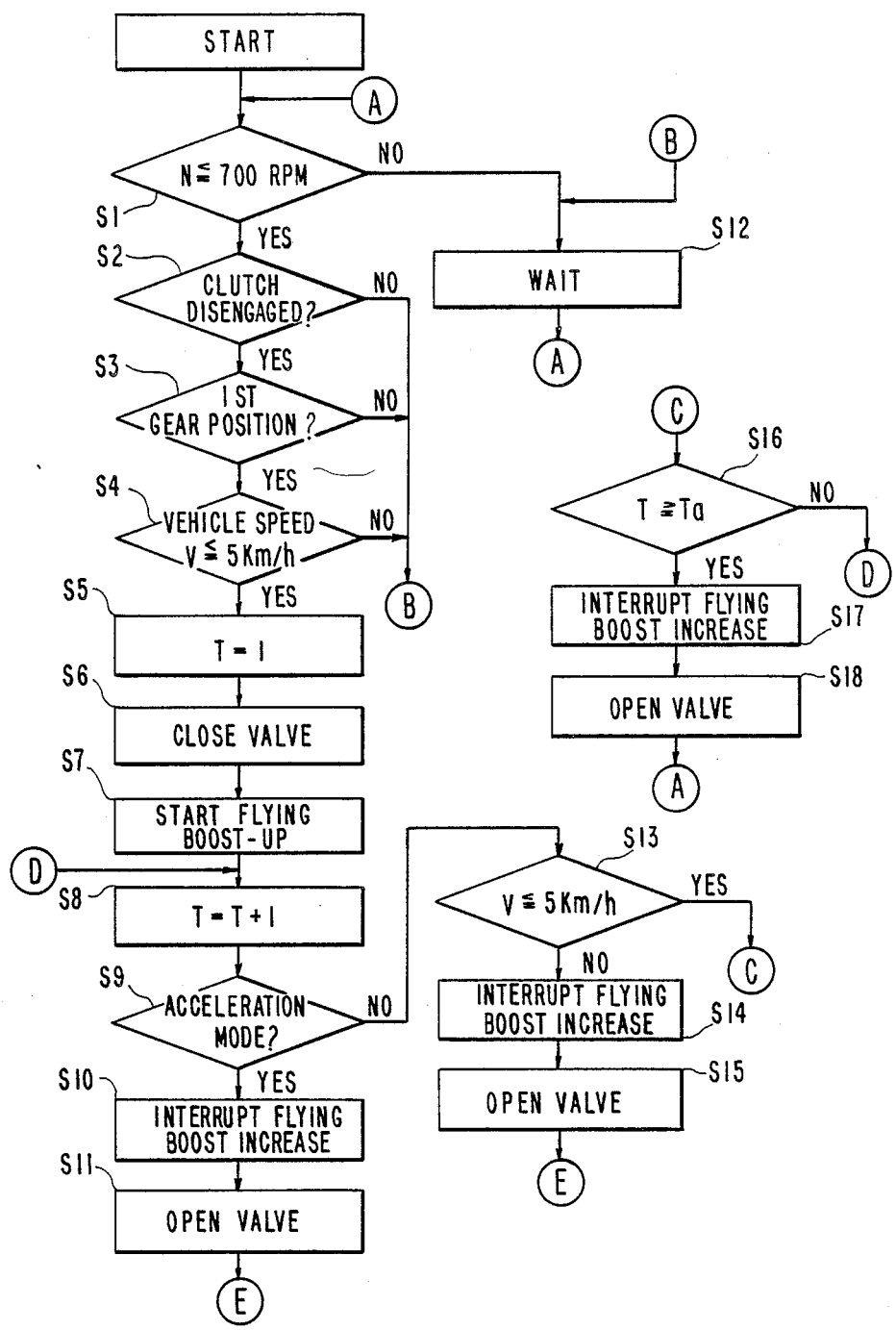
FIG. 2 is a flowchart of a control sequence of the turbocharger control system shown in FIG. 1.

A control sequence of the turbocharger control system thus constructed will be described below with reference to FIG. 2.

The control unit 9 compares an engine speed N detected by the engine speed sensor 13 with a preset engine speed (idling engine speed, i.e., 700 RPM) stored in the ROM 93 in a step S1. If the engine speed N is equal to or lower than the preset engine speed (700 RPM), then control proceeds to a step S2. If not, then control goes to a step S12. After a preset period of time has elapsed, control returns from the step S12 to the step S1. The step S2 determines whether the clutch 4 is disengaged or not based on the signal from the clutch operation sensor 41. If the clutch 4 is not disengaged, control goes to the step S12, and if the clutch 4 is disengaged, control proceeds to a step S3. The step S3 determines whether the transmission 5 is in a first gear position which is a vehicle starting gear position (however, the vehicle starting gear position for a truck is a second gear position) based on the signal from the gear position sensor 51. If the transmission 5 is not in the first gear position, then control goes to the step S12, and if the transmission 5 is in the first gear position, then control proceeds to a step S4. The step S4 compares a vehicle speed V as detected by the vehicle speed sensor 61 with a preset vehicle speed (e.g., 5 km/h) stored in the ROM 93. If the detected vehicle speed V is equal to or lower than the preset vehicle speed, then control proceeds to a step S5. If not, then control goes to the step S12.

If it is determined that the motor vehicle is about to start in the steps S1 through S5, then a counter T for counting a period of time for a flying boost increase is reset to "1" in a step S5. The term "flying boost increase" used herein means an increase in the boost pressure of the turbocharger 2 before the motor vehicle is started. Then, the control unit 9 applies a control signal to the actuator 8 in a step S6 to close the restriction valve 81, thus restricting the intake pipe 121 connected to the compressor 21. Then, the control unit 9 energizes the rotary electric machine 3 to operate the same as a motor, thus starting a flying boost increase in a step S7. Since the turbocharger 2 is driven and the boost pressure thereof is increased before the motor vehicle is started, therefore, the response of acceleration of the motor vehicle to a depression of the accelerator pedal is increased when the motor vehicle is started. The restriction valve 81 is closed to restrict the intake pipe 121 for the flying boost increase because the rate of flow of air into the turbocharger 2 should be lowered to reduce the work to be done by the compressor 21. Thus, the electric energy to be supplied to the rotary electric machine 3 will be reduced. Even with the restriction valve 81 being closed to restrict the intake pipe 121 to reduce the rate of air flow, since the turbocharger 2 is driven by the motor and its rotational speed is increased, the sufficient amount of air necessary to increase the boost pressure when the engine is idling can be maintained. After the counter T has been incremented by 1 in a step S8, a step S9 determines whether the engine has entered an acceleration mode or not based on the signals from the engine speed sensor 13 and the accelerator pedal movement sensor 101. If the engine has entered the acceleration mode in the step S9, then the flying boost increase is interrupted in a step S10, and the restriction valve 81 is opened in a step S11, after which an ordinary turbocharger control mode is initiated. Details of such an ordinary turbocharger control mode are described in Japanese Patent Application No. 62(1987)-261240 (Japanese Laid-Open Patent Publication No. 1(1989)-104948)).

If the engine has not entered the acceleration mode in the step S9, then control goes to a step S13 which compares the vehicle speed V as detected by the vehicle sensor 61 with the preset speed (5 km/h). If the vehicle speed V is higher than the preset speed (5 km/h), then the flying boost increase is interrupted in a step S14, and the restriction valve 81 is opened in a step S15. If the vehicle speed V is equal to or lower than the preset speed (5 km/h) in the step S13, then control goes to a step S16 which compares the period of time counted by the counter T with a preset time period. If the counted time period has reached the preset time period, then the flying boost increase is interrupted in step S17, and the restriction valve 81 is opened in a step S18. If the counted time period has not reached the preset time period in the step S16, then control goes to the step S8 in which the counter is incremented, and the flying boost increase is sustained.

With the present invention, as described above, when the motor vehicle is judged as being about to start, the rotary electric machine 3 mounted on the rotatable shaft 23 of the turbocharger 2 is operated as a motor before the accelerator pedal 10 is depressed, thus effecting a flying boost increase. Accordingly, the response of acceleration of the motor vehicle to a depression of the accelerator pedal at the time of starting the motor vehicle can be increased. When a flying boost increase is carried out, the restriction valve 81 in the intake pipe 121 leading to the compressor 21 of the turbocharger 2 is closed to restrict the intake pipe 121. Therefore, the work to be done by the compressor during the flying boost increase is reduced, so that the electric energy supplied to the rotary electric machine 3 may be reduced.

Although a certain preferred embodiment has been shown and described, it should be understood that many changes and modifications ma be made therein without departing from the scope of the appended claims.

What is claimed is:

1. A control system for controlling a turbocharger having a turbine operable by exhaust gases discharged from an engine of a motor vehicle, a compressor coupled to the turbine by a rotatable shaft, and a rotary electric machine mounted on the rotatable shaft, said control system comprising:
   an engine speed sensor for detecting the rotational speed of the engine;
   a clutch operation sensor for detecting a disengagement of the clutch;
   a gear position sensor for detecting a gear position of a transmission of the motor vehicle;
   a vehicle speed sensor for detecting the speed at which the motor vehicle is running; and
   control means operable in response to signals from said engine speed sensor, said clutch operation sensor, said gear position sensor, and said vehicle speed sensor, for operating the rotary electric machine as an electric motor when the rotational speed of the engine is lower than a predetermined speed, the clutch is disengaged, the gear position of the transmission is in a vehicle starting position, and the vehicle speed is lower than a predetermined speed.

2. A control system for controlling a turbocharger having a turbine operable by exhaust gases discharged from an engine of a motor vehicle, a compressor coupled to the turbine by a rotatable shaft, and a rotary electric machine mounted on the rotatable shaft, said control system comprising:
   intake restriction means for restricting the rate of air flow into the turbocharger, said intake restriction means being disposed in an intake pipe for introducing air into the compressor of the turbocharger;
   an engine speed sensor for detecting the rotational speed of the engine;
   a clutch operation sensor for detecting a disengagement of the clutch;
   a gear position sensor for detecting a gear position of a transmission of the motor vehicle;
   a vehicle speed sensor for detecting the speed at which the motor vehicle is running; and
   control means operable in response to signals from said engine speed sensor, said clutch operation sensor, said gear position sensor, and said vehicle speed sensor, for operating the rotary electric machine as an electric motor and controlling said variable intake restriction means when the rotational speed of the engine is lower than a predetermined speed, the clutch is disengaged, the gear position of the transmission is in a vehicle starting position, and the vehicle speed is lower than a predetermined speed.

3. A control system according to claim 1, wherein the rotational speed of the engine is an idle speed.

* * * * *